Figure 1:
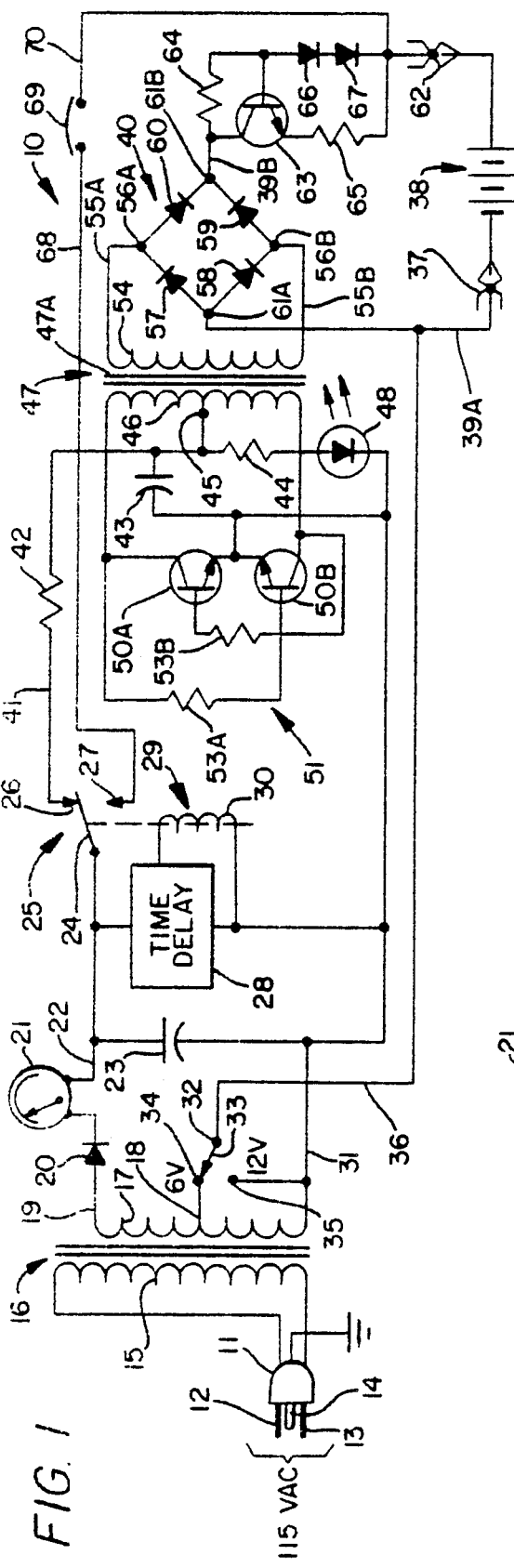

United States Patent [19]

Gali

[11] Patent Number: 5,063,341
[45] Date of Patent: Nov. 5, 1991

[54] LEAD ACID BATTERY REJUVENATOR AND CHARGER

[76] Inventor: Carl E. Gali, 6414 Faircove Cir., Garland, Tex. 75043

[21] Appl. No.: 598,133

[22] Filed: Oct. 16, 1990

[51] Int. Cl.⁵ .............................. H02J 7/00; H02J 7/02
[52] U.S. Cl. ......................................... 320/21; 320/2; 320/61; 323/906
[58] Field of Search ................ 320/2, 21, 61; 323/906

[56] References Cited

U.S. PATENT DOCUMENTS

| | | | |
|---|---|---|---|
| 3,629,681 | 12/1971 | Gurwicz | 320/21 |
| 3,761,795 | 9/1973 | Clayton et al. | 320/21 |
| 4,213,080 | 7/1988 | Rock | 320/21 |
| 4,274,044 | 6/1981 | Barre | 320/21 |
| 4,390,940 | 6/1983 | Corbefin et al. | 323/906 |
| 4,626,983 | 12/1986 | Harada et al. | 323/906 |
| 4,644,256 | 2/1987 | Farias et al. | 323/906 |
| 4,695,935 | 9/1987 | Oen et al. | 323/906 |
| 4,740,739 | 4/1988 | Quammen et al. | 320/21 |
| 4,786,851 | 11/1988 | Fuji et al. | 320/2 |
| 4,871,959 | 10/1989 | Gali | 320/61 |

FOREIGN PATENT DOCUMENTS

| | | | |
|---|---|---|---|
| 0311830 | 12/1989 | Japan | 320/2 |
| 0892577 | 12/1981 | U.S.S.R. | 320/21 |
| 0889306 | 2/1962 | United Kingdom | 320/2 |

Primary Examiner—Steven L. Stephan
Attorney, Agent, or Firm—Warren H. Kintzinger

[57] ABSTRACT

An electrical power source, either AC or DC, lead acid battery rejuvenator and charger circuit switchable between rejuvenator and charger modes of operation. For the rejuvenator mode of operation a rejuvenator pulse signal generating circuit supplies voltage in the form of fast rise voltage pulses peaking at a voltage necessary to cause battery plate saturation that is 1:1 to 1:3 times the theoretical battery cell voltage. This is accomplished by use of very short duration pulses in the order of 5 micro seconds or less time width wise with extremely fast rise time in the order of 5 mega volts per second rise time with these pulses occurring in approximately the 2,000 to 10,000 times per second frequency range. The transfer of electrons between metal electrode and ions in battery lead acid solution is not instantaneous, and that therefore with the fast rise time pulses rising to 1:1 to 1:3 times battery cell voltage the instantaneous voltage is distributed over entire battery plate surfaces and lead sulphate deposits that have occurred on battery plate surfaces will be released, either going back into the solution or broken up.

29 Claims, 5 Drawing Sheets

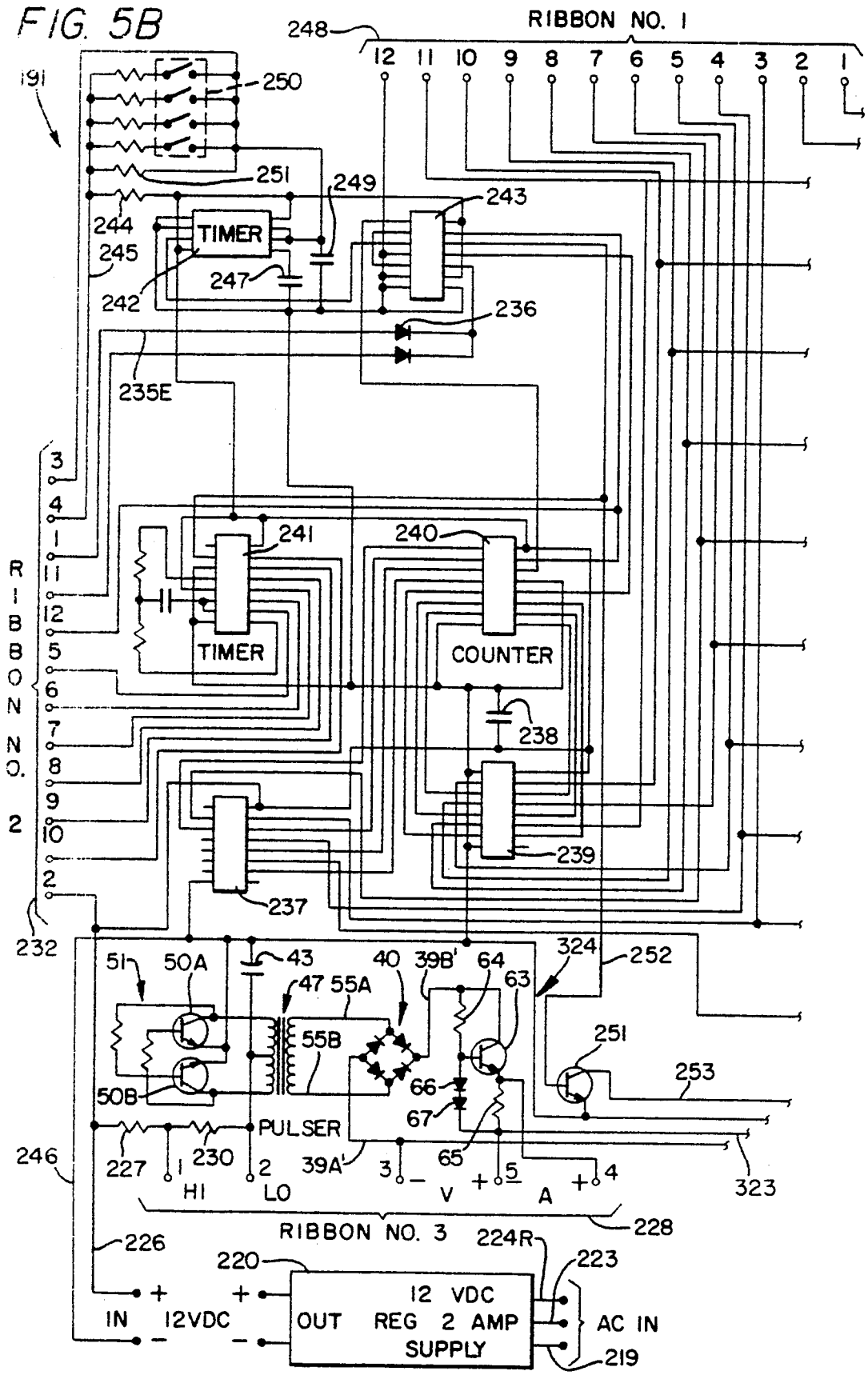

LEAD ACID BATTERY REJUVENATOR AND CHARGER

This invention relates in general to battery chargers, and more particularly, to lead acid battery combination rejuvenator and trickle charger units.

A characteristic of lead acid batteries is that lead sulfate deposits slowly build up on the plates to partially cover and/or replace the lead and lead dioxide plate surfaces. Low current recharging is inadequate in that it cannot, as such, sufficiently remove such deposits that with the passage of time crystallize and choke the battery plates by interfering blockage of electrolyte movement. Through the years many people have tried to dislodge these deposits by "Fast Charging", an approach that generally ultimately overheats and warps the lead plates in a battery. When this occurs a battery may still appear to have taken a charge and even the electrolyte may check as being correct but the battery does not hold the charge as the plates are effectively shorted. The transfer of electrons between metal (lead) electrodes and ions in a solution is not instantaneous. Thus, with a series of sufficiently fast rise time voltage pulses to voltage levels above the theoretical cell voltage the close to instantaneous voltage is distributed over the entire lead plate surfaces and the lead sulfation that is built up on the plate surfaces will be released, either going back into the solution or broken up.

It is, therefore, a principal object of this invention to provide combination rejuvenator and trickle chargers for lead acid batteries.

Another object is to provide such combination rejuvenator and trickle chargers capable of removing lead sulfate deposits even in the crystallized state from the lead plates of lead acid batteries.

A further object is to prevent overheating and warpage of lead plates in a battery when charging efforts are made to dislodge deposits from lead acid battery plates.

Still another object is to significantly extend the useful service life and reliability of lead acid batteries.

Features of the invention useful in accomplishing the above objects include, in combination rejuvenator and trickle chargers for lead acid batteries and electrical power source, either AC or DC, lead acid battery rejuvenator and charger circuits switchable between rejuvenator and charger modes of operation. For the rejuvenator mode of operation a rejuvenator pulse signal generating circuit supplies voltage in the form of fast rise voltage pulses peaking at a voltage necessary to cause battery plate saturation that is 1:1 to 1:3 times the theoretical battery cell voltage. This is accomplished by use of very short duration pulses in the order of 5 micro seconds or less time width wise with as extremely fast rise time in the order of 5 mega volts per second rise time with these pulses occurring in approximately the 2,000 to 10,000 times per second frequency range. The transfer of electrons between metal electrode and ions in battery lead acid solution is not instantaneous, and that therefore with the fast rise time pulses rising to 1:1 to 1:3 times battery cell voltage the instantaneous voltage is distributed over entire battery plate surfaces and lead sulphate deposits that have occurred on battery plate surfaces will be released, either going back into solution or broken up. Some combination rejuvenator and trickle charger units alternate between rejuvenating and charging modes of operations, some embodiments have rejuvenating pulse inputs to batteries superimposed on charging voltages and with some the rejuvenating pulse inputs to a plurality of batteries superimposed on charging voltages is cycled serially through multiple sets of output connections to batteries being rejuvenation treated and charged.

Specific embodiments representing what are presently regarded as the best modes of carrying out the invention are illustrated in the accompanying drawings.

Figure 2:
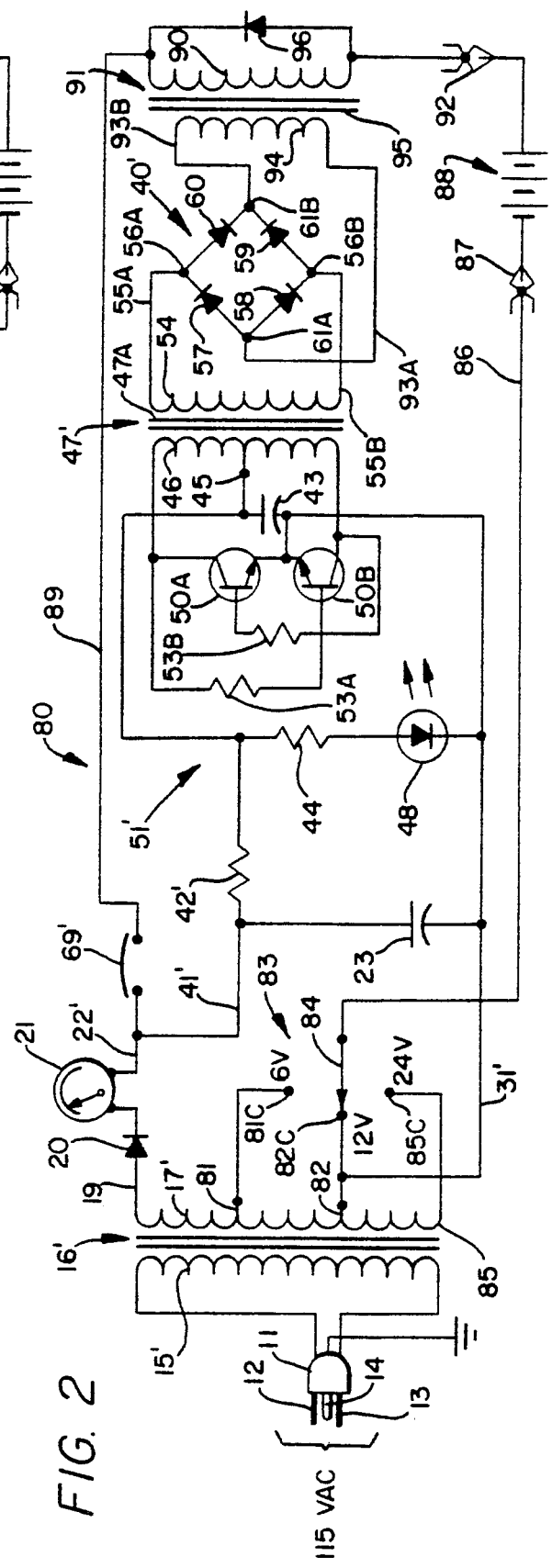
Figures 3, 4:
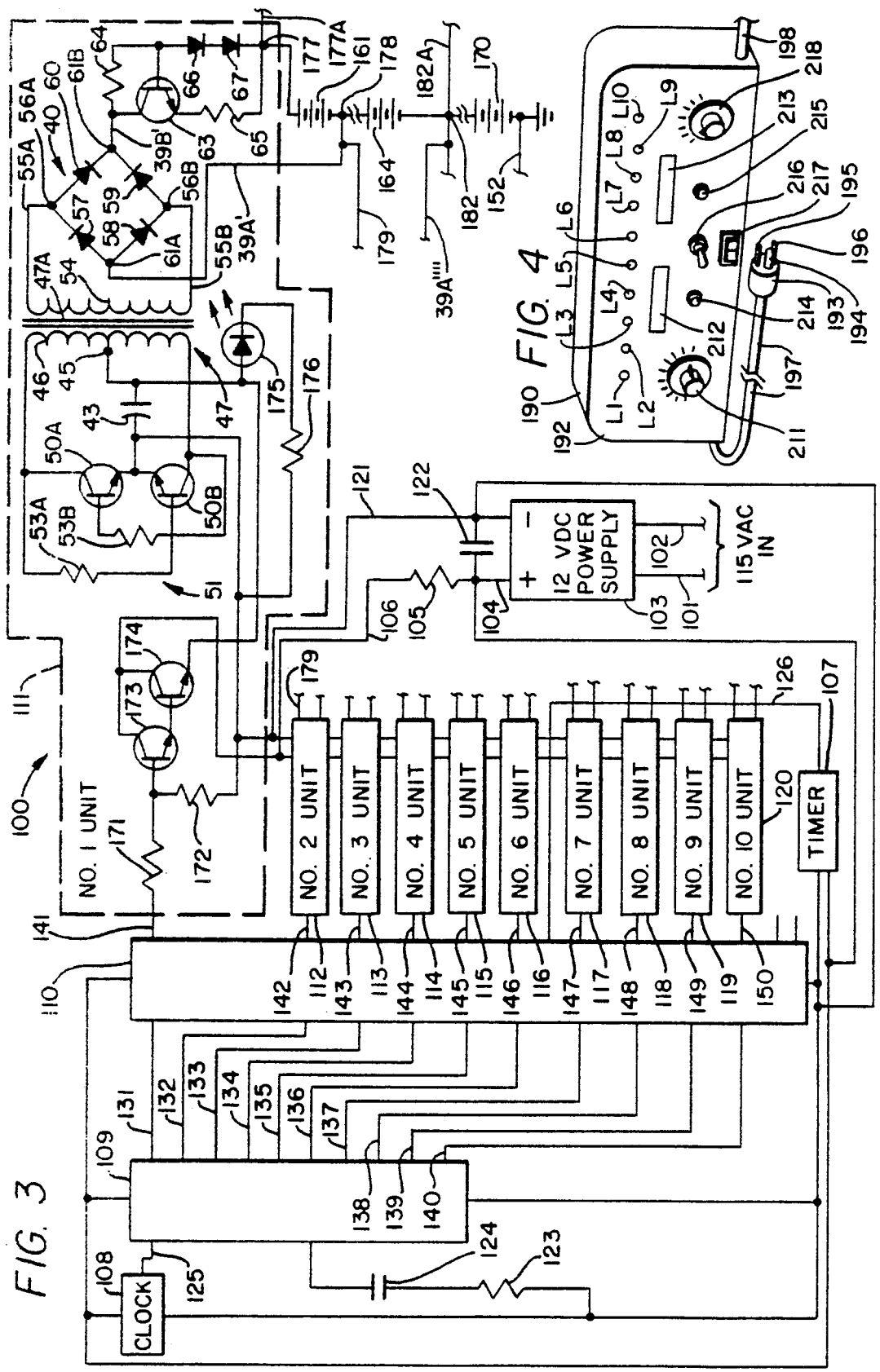
Figure 5A:
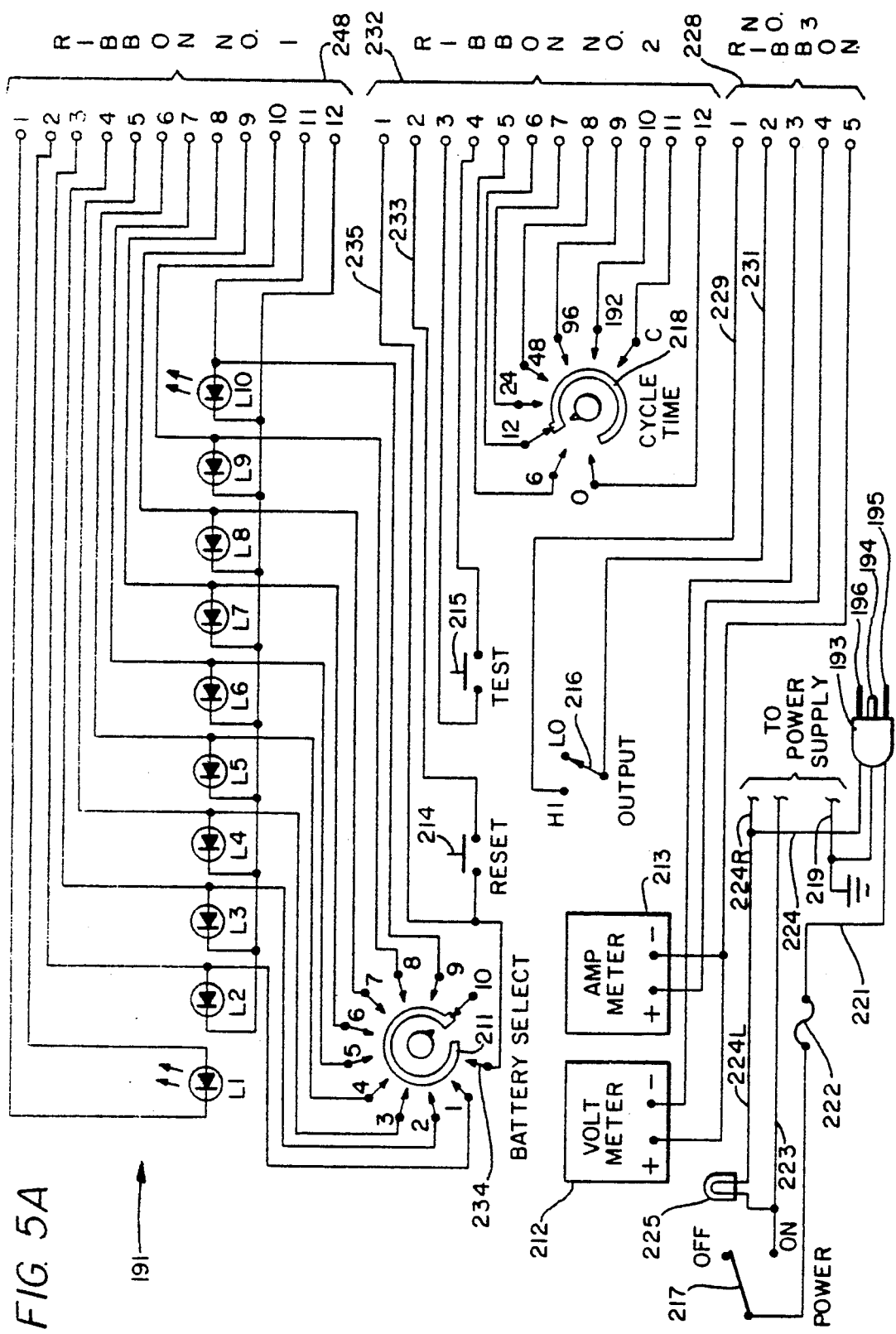
Figure 5C:
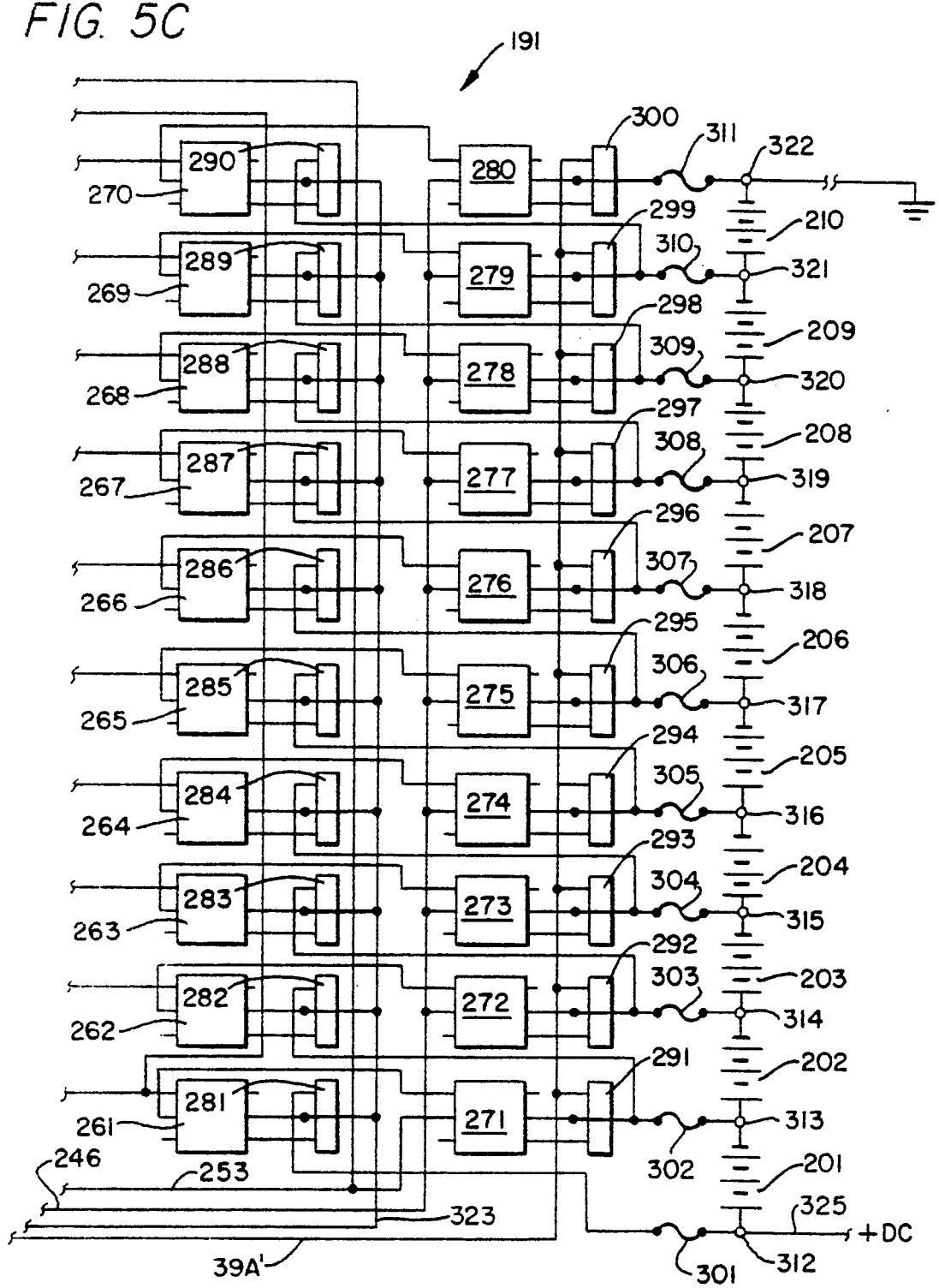

In the drawings:

FIG. 1 represents a schematic drawing of a lead acid battery combination rejuvenator and trickle charger unit that alternates between the rejuvenation and charging modes of operation;

FIG. 2, a schematic of a combination rejuvenator and trickle charger unit where positive going pulses of the rejuvenation action are superimposed above battery charging voltage;

FIG. 3, a block schematic view of a combination rejuvenator and trickle charger unit for simultaneously charging a plurality of lead acid batteries and with rejuvenating action pulses being cycled with, respective, periods of time to successive sets of output terminals connected to batteries being charged;

FIG. 4, a perspective view of the box for FIGS. 5A, 5B and 5C combination rejuvenator and trickle charger unit for lead acid batteries showing front panel display and control detail; and FIGS. 5A, 5B and 5C, a block schematic view of another combination rejuvenator and trickle charger for lead acid batteries settable for a predetermined number of batteries and with cycled application of rejuvenating action pulses superimposed as positive going pulses on charging voltage applied to battery connected terminals successively terminal set by set.

Referring to the drawings:

The lead acid battery combination rejuvenator and trickle charger unit 10, of FIG. 1, is shown to have a three pronged plug 11, insertable into a 115 volt AC receptacle, with opposite AC prongs 12 and 13 and a ground prong 14. The opposite AC prongs 12 and 13 are connected to the opposite ends of the primary coil 15 of transformer 16 having a secondary coil 17 with a center tap 18. The top of secondary coil 17 is connected through line 19 to the anode of rectifier diode 20 the cathode of which is connected through ammeter 21 and line 22 to DC filter capacitor 23, to switch arm 24 of relay switch 25 that is switchable between the rejuvenator operational mode contact 26 and the charge mode contact 27. Time control circuit 28 is also connected to line 22 for time controlled activation of relay 29 in alternately switching relay switch 25 between the battery rejuvenator and charging modes of operation. The DC filter capacitor 23 and the time control circuit 28 along with relay coil 30 are also connected to line 31 from the bottom of secondary coil 17. A manually operated switch 32 has switch arm 33 switchable between contact 34 connection with coil 17 tap 18 for a six volt charge setting and contact 35 connection with line 31 for a twelve volt charge setting. The arm 33 of switch 32 is connected through line 36 and connection 37 to the negative terminal of battery 38 (whether 6 volt or 12 volt), subject to being rejuvenated and charged and also through line branch 39A of line 36 to the negative terminal of four diode bridge circuit 40.

With relay switch 25 in the switched state of FIG. 1 rectified DC is fed through line 41 from switch contact 26 through resistor 42 to the junction of capacitor 43, resistor 44 and the center tap 45 of the primary coil 46 of transformer 47. The bottom of the secondary coil 17 of transformer 16 is connected through line 31 to and through light emitting diode 48 and resistor 44 to the center tap 45 of transformer coil 26 and capacitor 43. Line 31 is also connected directly to the other side of capacitor 43 and to the junction of the emitters of NPN transistors 50A and 50B in DC to AC inverter multi-vibrator circuit 51. The opposite ends of transformer primary coil 46 are connected through lines 52A and 52B to the collectors, respectively, of transistors 50A and 50B and on, respectively, through resistors 53A and 53B to the bases of NPN transistors 50A and 50B.

The secondary coil 54 of transformer 47 has a turns ratio in the order of 1 to 1 from the primary coil 46 such as to produce an output unloaded voltage in the range of some thirty to forty volts AC and has a ferrite ceramic core element 47A as an aid for the transformer 47 being a fast rise time transformer in the order of two nano seconds per volt rise. Coil 54 has its opposite ends connected through lines 55A and 55B to two opposite terminals 56A and 56B of a four diode 57, 58, 59 and 60 AC to DC rectifier bridge 40. The other two opposite terminals 61A and 61B of the AC to DC rectifier bridge 40 are connected to lines 39A and 39B that are circuit connected to clips 37 and 62 connectable to, respectively, the negative and positive terminals of battery 38. The line 39B from the bridge 40 includes connection to the collector of NPN transistor 63 and connection through a voltage bias resistor 64 to the base of NPN transistor 63. In addition a resistor 65 is connected between the emitter of NPN transistor 63 and the connector 62, and two diodes 66 and 67 are serially connected anodes toward the base of NPN transistor 63 and cathodes toward the battery connection clip 62. The diodes 66 and 67 protect the NPN transistor 63 from burn-out damage when connector clips 62 and 37 are mistakenly connected to the battery 38 in reverse.

When the relay 29 connects switch arm 24 to contact 27 the unit 10 is switched from the rejuvenation mode to the charging mode with positive DC out of rectifier diode 20 and passed through ammeter 21 connected through line 68, over current breaker 69 and line 70 to battery connector clip 62.

The combination rejuvenator and trickle charger 80 embodiment of FIG. 2 that, while having some portions the same as with the embodiment of FIG. 1, has positive going pulses of the rejuvenation action superimposed above battery charging voltage. With this embodiment with three pronged plug 11, insertable into a 115 volt AC receptacle, the opposite AC prongs 12 are connected to opposite ends of the primary coil 15' of transformer 16' having a secondary coil 17' with two intermediate taps 81 and 82. A manually operated switch 83 has a switch arm 84 switchable between contacts 81C, for six volt battery charging, 82C, for twelve volt battery charging, and 85C for twenty four volt battery charging with contact 85C connected to the bottom end 85 of secondary coil 17'. Line 86 extends from switch arm 84 to battery terminal chip 87 shown as being connected to the negative terminal of battery 88 that with the switch 83 set at 12 volts should be a twelve volt battery being treated and charged. Instead of line 31' being connected to the bottom of coil 85 it is connected to run from coil tap 82, for twelve volts, to the DC to AC multi-vibrator circuit 51'. The other input to the circuit 51' is the rectified output of diode 20 passed through ammeter 21 and lines 22' and 41'. Line 22' is also connected through over current breaker 69' to and through line 89 and on through secondary coil 90 of transformer 91 to battery terminal clip 92 shown as being connected to the positive terminal of battery 88. The pulse signal output terminals 61A and 61B are connected through lines 93A and 93B to, respectively, the bottom and top of the primary coil 94 of transformer 91 that has a turns ratio in the order of 1 to 1 from primary coil 94 to secondary coil 90 such as to produce an output unloaded voltage in the range of some thirty to forty volts AC. Transformer 91 has a ferrite ceramic core element 95 like the core element 47A of transformer 47' as an aid for these transformers being fast rise time transformers in the order of two nano seconds per volt rise. Diode 96 is connected in parallel with transformer secondary coil 90 cathode toward line 89 and anode toward battery positive terminal connection clip 92 such as to clip saturation reverse pulses out of coil 90. Since the signal pulse current level passed through the coils of transformer 47' and the primary coil 94 of transformer 91 may be fine light wire with, for example, coil 94 having typically thirty turns. Secondary coil 90 of transformer 91 has the same number (or approximately the same number) of turns as primary coil 94 but may have to be of somewhat heavier gauge wire since it must carry the battery charging direct current with the rejuvenating positive going pulses superimposed thereon.

Both the embodiments of FIGS. 1 and 2 generate fast time very short duration pulses on the order of five micro seconds or less with a five mega volt per second rise time to 1:1 to 1:3 times the theoretical cell voltage with pulses in the approximate range of from 2,000 to 10,000 times per second. With the embodiment of FIG. 1 the rejuvenation mode is alternated with the DC charging mode while with the embodiment of FIG. 2 the rejuvenating pulse action is superimposed on the DC charging voltage level.

Typical values for components in the FIGS. 1 and 2 embodiments include:

| Capacitors 43 | 450 μf at 20 volts |
|---|---|
| Resistors 53A and 53B | 1K Ohms |
| Diodes 57, 58, 59 and 60 | 1 Amp Diodes |
| Resistor 64 | 1,500 Ohms |
| Resistor 65 | 5 Ohms |

The rejuvenator circuit 100 used with a DC charger embodiment of FIG. 3 is a unit for simultaneously charging a plurality of lead acid batteries and with rejuvenation action pulses being applied to terminals of at least one battery at a time while that battery is also being charged and with application of rejuvenation action pulses being cycled from battery connection terminal set to set through the range of terminal sets connected to batteries being charged. A two line 101 and 102 115 volt AC input is connected to 12 volt DC power supply 103 having a positive output 104 connected through load resistor 105 (that prevents overcurrent on pulser circuits) and line 106 to the No. 1 unit 111 and to the No. 2–10 units 112–120. The positive output line 104 is also connected to timer circuit 107, clock circuit 108, decade counter circuit 109 and three state buffer 1 driver circuit 110. The DC power supply 103 has a negative line 121 connection through capacitor 122 to the positive line 104, to the No. 1 unit 111 and to the No. 2–10 units 112–120, to time circuit 107, clock circuit 108 decade counter circuit 109 and three state buffer/driver circuit 110. The negative line 121 is also connected serially through resistor 123 and capacitor 124 to decade counter circuit 109. Clock circuit 108 has a sixty HZ per hour output line 125 to decade counter circuit 109, and timer circuit 107 has an on-off pulse timing output line 126 connected to the three state buffer/driver circuit 110. The clock circuit 108 output as applied to decade counter circuit 109 sets up basic time cycle pulses that determine time on for each pulser unit 111–120 with these units being cycled on one at a time in sequence 1, 2, 3, 4 etc., and when it comes to Number 10, the three state buffer/driver is reset to activate Unit No. 1 (111) starting over again in a recycle sequence. This is with decade counter circuit 109 having the individual sequential pulse on one at time output lines 131–140 activating connections to three state buffer/driver circuit 110. The timer circuit 107 determines how long the pulser's 111–120 operate as a sequentially actuated group through repeated cycles of operation as actuated one at a time via output voltage pulse activation lines 141–150 from circuit 110 to individually the one through ten rejuvenating pulse circuits 111–120 out of a twenty four hour or more time period. When the voltage level output of timer circuit 110 is low the buffer/circuit 110 is switched off and all rejuvenating pulse circuits 111–120 are shut down and when circuit 107 output voltage goes high the activation drive cycle of circuits 111–120 resumes.

The No. 1 unit rejuvenating pulse circuit 111 is schematically shown in detail with the remaining No.'s 2–10 units 112–120, being duplicates thereof, individually input connected to the three stage buffer/driver circuit 110. Each of the circuits 111–120, respectively, have two output connections including a connection 152 to ground connected to, respectively, the positive and negative battery terminals of respective batteries 161–170 serially connected between the top terminal connections and the ground connection 152 with the bottom most thereof being a connection to ground.

The output voltage activation line 141 from the three state buffer/driver circuit 110 is connected through resistors 171 and 172 (typically 500 Ohms respectively) to negative line 121. The junction of resistors 171 and 172 is connected to the base of NPN transistor 173 having an emitter to base connection to transistor 174 and a joint collector to collector connection to the positive voltage line 106. The emitter of NPN transistor 174 is connected to the anode of light emitting diode 175 and through the LED 175 and resistor 176 (600 Ohms) to the negative DC voltage line 121, and also to the junction of the center tap 45 of the primary coil 46 of transformer 47 and capacitor 43 of DC to AC multivibrator circuit 51. Circuit 51, transformer 47 and the four diode AC to DC rectifier bridge circuit 40 and the 39B' line output therefrom to the collector of NPN transistor 63 and through resistor 64 to the base of the transistor and through diodes serially 66 and 67 to the output connection 177 and connection of the emitter through resistor 65 to connection are much the same as with the embodiment of FIG. 1. Numbering other than for output connections are the same and description thereof is not repeated again as a matter of convenience. Please note that a conventional DC charging system of 120 volts (not shown) is connected through line 177A to terminal 177 and to ground for charging ten series connected 12 volt batteries between terminal 177 and ground connection 152. The negative output line 39A is connected to terminal 178 below battery 161 with terminal 178 being the battery 162 top terminal connection from output line 179 for the unit No. 2 (112) etc. A forty eight volt battery (not shown) is connected between line 177A and line 182A from terminal 182 in parallel with series connected 12 volt batteries 161, 162, 163 and 164. When the No. 1 unit rejuvenating pulse circuit 111 is activated it not only applies rejuvenating positive going fast rise time pulses in the range of 2,000 to 10,000 or more pulses per second to battery 161 but also to the forty eight volt battery connected between line 177A and line 182A.

Referring now to FIGS. 4 and 5A, 5B and 5C a box 190 is shown in FIG. 4 that contains the combination rejuvenator and trickle charger 191 of FIGS. 5A, 5B and 5C. Control box 190 has a front control face 192, a three pronged AC plug 193 with a ground prong 194 and AC power prongs 195 and 196, connected by cord 197 and a multi-wire connection cable 198 connecting the output to batteries 201–210. The face 192 of box 190 has light emitting diodes L1, L2–L10 displays indicating which battery rejuvenation circuit connection is activated, a battery select dial 211, voltage display meter 212, amperage display meter 213, a reset button 214, test button 215, a LO-HI switch 216, a power ON-OFF switch 217, and an hours cycle time dial 218. The ground prong 194 is shown in FIGS. 5A and 5B to be connected through line 219 to AC to DC 12 volt DC supply 220. The AC power prong 195 is shown to be connected through line 221 to and through fuse 222 to switch 217 that when switched from the OFF to ON contact on through line 223 to the AC to DC supply 220. The AC power prong 196 is shown to be connected through line 224 and line branch 224L to and through light 225 to line 223, and through line branch 224R to the AC to DC volt supply 220.

The positive output line 226 from the 12 volt DC power supply 220 is connected through resistor 227 to a connector pin 1 connection of the No. 3 ribbon connector 228 through line 229 to the HI contact of switch 216 and on through resistor 230 to a connector 228 pin 2 connection through line 231 to the arm of switch 216 switchable between LO and HI. Positive line 226 is also connected via pin No 2 connection of the No. 2 ribbon connector 232 to and through line 233 to and through the reset push button connector 214 to contact 234 of the battery selection dial 211 and also back through line 235 to the pin No. 1 of ribbon connector 232 and line 235E to the anode of diode 236. Line 226 in addition connects to buffer circuit chip 237, to capacitor 238, to flip flop chip 239, to flip flop chip 240 to pins 5 and 16 of timer chip 241, to pins 4 and 8 of timer chip 242, to pins 9 and 14 of flip flop chip 243 and through resistor 244 to line 245. The negative line 246 from 12 volt DC supply 220 is connected to pin 8 of buffer chip 237 to the junction of the emitters of NPN transistors 50A and 50B and through capacitor 43 to the tap 45, of primary coil 46 of transformer 47, the resistor 230 and to pin 2 of connector 228. Additional connections of negative line 246 include the number 1 and 8 pins of flip flop 239, capacitor 238, the number 8 and 13 pins of flip flop 240, the number 3 and 8 pins of timer 241, the number 1 and 2 pins of timer 242, the number 4, 6, 7 and 8 pins of flip flop 243, through capacitor 247 to the number 5 pin of timer 242, the pin 12 connection of the No. 3 ribbon connector 248, and through capacitor 249 to the number 6 and 7 pins of timer 242 and to timing sequence circuit 250 and through resistor 251 to the pin 4 connection of the No. 2 ribbon connector 248 and to pin 3 thereof. The negative line 246 is also connected to the emitter of NPN transistor 251, having a base connection through line 252 to the number 2 pin of timer 241 and the number 13 pin of flip flop 243 and a collector connection through line 253 to the pin 1 connection of the No. 1 ribbon connector 248. This connection extends on to LED L1 that is connected back through the pin connection of the No. 1 ribbon connector 248 to the No. 1 terminal of optical coupler 261 and to the number 11 terminal of buffer chip 237. Optical coupler 261 is one of twenty identical (TIL 128 type) optical couplers 161-280 in two ten unit arrays of couplers. Twenty identical NPN transistors 281-300 (TIL-128 type) are associated, respectively, with the outputs of optical couplers 161-280 in turn developing output connections through fuses 301-311, respectively, for rejuvenating pulse current flow through to respective sets of battery 201-210 connection terminals 312-322. The negative output of the four diode bridge 40 is connected via pin connection No. 3 of ribbon No. 3 connector 228 as a negative connection to volt meter 212, the positive pulse output of the diodes connected to the transistor base and the resistor connected to the transistor emitter are connected via connection pin No. 5 of ribbon No. 3 connector 228 as the positive connection to volt meter 212 and as the negative input to ammeter 213, and also to the interconnects between the optical couplers 261-270 and the collectors of NPN transistors 281-290 via line extension 323. The negative output of the four diode bridge 40 is also connected to the emitter electrodes of NPN transistors 291-300 via extension of line 39A'. The emitter of transistor 63 is connected via pin 4 of ribbon No. 3 connector 228 as the positive connection of ammeter 213.

While the rejuvenator circuit 191 is shown as being output connected to ten series connected twelve volt batteries 201-210 it could have output connections to fewer batteries with battery select dial 211 being set for the fewer number of batteries connected serially toward and terminating at the ground terminal with repeated cycling of rejuvenating pulse input to individual batteries one at a time. Further, cycle time limits may be set for a desired number of hours 0, 6, 12, 24, 48, 96 or 192 hours for battery rejuvenation. This embodiment has only one fast rise time pulse output generating circuit 324 in place of ten fast rise time pulse output generating circuits (111-120). With this FIGS. 4, 5A, 5B and 5C embodiment the control circuitry, timers, counter circuit, flip flops, optical coupler arrays and transistor arrays selectively and cyclically control connects the fast rise time pulse output, in the range of 2,000 to 10,000 cycles per second or more, of the fast rise time pulse output generating circuit 324 to one battery at a time. Please note that the batteries could be subjected to simultaneous standard DC charging from a DC source such as +120 volt DC through line 325 to terminal 312 with terminal 322 connected to ground.

Whereas this invention has been described with respect to several embodiments thereof, it should be realized that various changes may be made without departure from the essential contributions to the art made by the teachings hereof.

I claim:

1. A combination rejuvenator and trickle charger for lead acid batteries comprising: AC power connection means: AC transference means; AC to DC conversion means; a DC to AC inverter multi-vibrator circuit connected to said AC to DC conversion means and to said AC transference means; a transformer with a primary coil a part of said DC to AC inverter multi-vibrator circuit, and having a secondary coil; a four diode rectifier bridge circuit having a first set of opposite terminals connected to said secondary coil, and a second set of opposite terminals; first connection means for connecting a first one of the terminals of said second set of bridge opposite terminals to a first terminal of a lead acid battery and second connection means for connecting the second of the terminals of said second set of bridge opposite terminals to the lead acid battery; one of said first and second connection means includes connection of terminal means of said second set of bridge opposite terminals through circuit means to a battery terminal connector.

2. The combination rejuvenator and trickle charger of claim 1, wherein there is approximately a 1 to 1 turns ratio with approximately the same turns in said secondary coil as there is in said primary coil of said transformer.

3. The combination rejuvenator and trickle charger of claim 2, wherein the core of said transformer is a ferrite ceramic core element having fast electromagnetic field change characteristics as an aid for the transfer being a fast rise time transformer in the approximate order of two nano seconds per volt rise.

4. The combination rejuvenator and trickle charger of claim 3, wherein said DC to AC inverter multi-vibrator circuit includes two transistors having a common electrode connection of first electrodes of said transistors connected to a first side of a capacitor having a second side connected to a tap of said primary coil; said power source circuit having a first lead and a second lead with said first lead connected to the junction of said capacitor and said tap of said primary coil; and with said second lead connected to the junction of said first electrodes of said transistors common connection and said capacitor; with opposite ends of said primary coil connected to second electrodes of said transistors and to resistors connected to the bases, respectively, of said transistors.

5. The combination rejuvenator and trickle charger of claim 4, wherein said two transistors in said DC to AC inverter multi-vibrator circuit are NPN type transistors with said common electrode connection of said transistors a connection between the emitters of said two transistors.

6. The combination rejuvenator and trickle charger of claim 5, wherein the opposite ends of said primary coil are connected to the collectors of said NPN transistors and through said resistors, respectively, to the base of the opposite transistor from the collector connections of said two transistors.

7. The combination rejuvenator and trickle charger of claim 6, wherein a resistor that is a current limiting resistor is included in connection means to the battery.

8. The combination rejuvenator and trickle charger of claim 2, wherein said DC to AC inverter multi-vibrator circuit includes two transistors having a common electrode connection of first electrodes of said transistors connected to a first side of a capacitor having a second side connected to a tap of said primary coil; said power source circuit having a first lead and a second lead with said first lead connected to the junction of said capacitor and said tap of said primary coil; and with said second lead connected to the junction of said first electrodes of said transistors common connection and said capacitor; with opposite ends of said primary coil connected to second electrodes of said transistors and to resistors connected to the bases, respectively, of said transistors; and with a resistor serving as a current limiting resistor in connection means to one of two terminals of a lead acid battery.

9. The combination rejuvenator and trickle charger of claim 8, wherein said two transistors in said DC to AC inverter multi-vibrator circuit are NPN type transistors with said common electrode connection of said transistors a connection between the emitters of said two transistors.

10. The combination rejuvenator and trickle charger of claim 9, wherein opposite ends of said primary coil are connected to the collectors of said NPN transistors and through said resistors, respectively, to the base of the opposite transistor from the collector connections of said two transistors.

11. The combination rejuvenator and trickle charger of claim 10, wherein said transistor in said connection means is a NPN transistor; and said diode means is connected anode to the base of said transistor in said connection means and cathode to said battery terminal connector.

12. The combination rejuvenator and trickle charger of claim 11, wherein said diode means is a plurality of diodes serially connected diode cathode to diode anode.

13. The combination rejuvenator and trickle charger of claim 12, wherein said diode means is two diodes serially connected diode cathode to diode anode.

14. The combination rejuvenator and trickle charger of claim 11, wherein said AC transference means is an input power transformer with a primary coil connected to said AC power connection means, a ferrite material core element, and an AC signal tapped secondary coil; said AC to DC conversion means is a rectifier diode connected anode to the top of said AC signal tapped secondary coil; switch means includes switch contact means connected to AC signal tap means, and a switch contact connected to the bottom of said AC signal tapped secondary coil; and DC connection means for interconnecting rectified DC from the cathode of said rectifier diode to said inverter multi-vibrator circuit.

15. The combination rejuvenator and trickle charger of claim 14, wherein said switch contact means is connected to a center tap of said AC signal tapped secondary coil; and connectable by said switch means to the negative terminal of a battery connected for being rejuvenated and charged.

16. The combination rejuvenator and trickle charger of claim 15, wherein said switch means is switchable from connection to said center tap for treating of a six volt battery to connection to the bottom of said AC signal tapped secondary coil for rejuvenation treatment and charging of a twelve volt battery.

17. The combination rejuvenator and trickle charger of claim 16, wherein a negative output terminal of said four diode AC to DC rectifying bridge circuit is also connected to the negative terminal of a battery being treated; and the bottom of said AC tapped secondary coil is connected to said inverter multi-vibrator circuit.

18. The combination rejuvenator and trickle charger of claim 17, wherein DC connection means is provided switch connectable to said DC to AC inverter multi-vibrator circuit; and said AC to DC conversion means via said DC connection means is switch connectable to line means to one of two terminals of a lead acid battery.

19. The combination rejuvenator and trickle charger of claim 3, wherein said DC to AC inverter multi-vibrator circuit includes two transistors having a common electrode connection of first electrodes of said transistors connected to a first side of a capacitor having a second side connected to a tap of said primary coil; said power source circuit having a first lead and a second lead with said first lead connected to the junction of said capacitor and said tap of said primary coil; and with said second lead connected to the junction of said first electrodes of said transistors common connection and said capacitor; with opposite ends of said primary coil connected to second electrodes of said transistors and to resistors connected to the bases, respectively, of said transistors; an output signal pulse transformer with a primary coil and with said second set of opposite terminals of said four diode rectifier bridge circuit connected to opposite ends of the primary coil of said output signal pulse transformer; said output signal pulse transformer having said primary coil, a ferrite ceramic core element having fast electromagnetic field change characteristics as an aid for the transformer being a fast rise transformer, and a secondary coil; a diode connected between opposite ends of said output signal pulse transformer secondary coil; connection of said AC to DC conversion means to one end of said output signal pulse transformer secondary coil and through said coil to battery positive terminal connection means; said AC transference means is an input power transformer with a primary coil connected to said AC power connection means, a ferrite material core element, and a signal secondary coil with connection means to battery negative connector means.

20. The combination rejuvenator and trickle charger of claim 19, wherein said connection means to battery negative connection means includes two alternately connectable coil taps from, and the bottom end of, said AC signal secondary coil connected, respectively, to the six volt contact, the twelve volt contact and twenty four volt contact of a switch with its switch arm connected to said battery negative connection means.

21. The combination rejuvenator and trickle charger of claim 20, wherein said coil tap connected to said twelve volt contact is connected to said DC to AC inverter multi-vibrator circuit.

22. The combination rejuvenator and trickle charger of claim 7, wherein there are a plurality of pulse circuits/duplicates of each other, including said DC to AC inverter multi-vibrator circuit, said transformer, said four diode bridge output connectable, respectively, to a plurality of sets of battery connections equal in number to the plurality of said pulser circuits; control means for activating one of said plurality of pulser circuits at a time including, a timer circuit, a clock circuit, a decade counter circuit, and a buffer driver circuit having a plurality of outputs connected to said plurality of pulser circuits for individually activating said plurality of pulser circuits one at a time through repeated cycles of operation.

23. The combination rejuvenator and trickle charger of claim 22, wherein each of said signal pulser circuits include two NPN transistors interconnected, in an input section prior to said DC to AC inverter multi-vibrator circuit, to give sharp turn on and turn off of the signal pulser circuits; with a first NPN transistor having a signal input base connection, an emitter to base connection with a second NPN transistor, a collector connection in common with the collector of the second NPN transistor to a voltage bias line, and a voltage signal output line connection from the output emitter of said second NPN transistor to said inverter multi-vibrator circuit.

24. The combination rejuvenator and trickle charger of claim 22, wherein a plurality of batteries equal in number to the sets of battery connections and to the plurality of said pulser circuits are series connected between the positive terminal of a standard battery DC charging system and ground common to said standard battery DC charging system.

25. The combination rejuvenator and trickle charger of claim 7, wherein there is one signal pulse circuit including DC to AC inverter multi-vibrator circuit, said transformer, said four diode bridge circuit output selectively connectable singularly sequentially to a plurality of sets of battery connections where a plurality of batteries are serially connected; circuit control means for switched control connection of the pulse signal output of said signal pulser circuit successively through said sets of battery connections at time control set cycles of operation.

26. The combination rejuvenator and trickle charger of claim 25, wherein said control means includes, control circuitry interconnected timers, a counter circuit, flip flop circuits, optical coupler arrays and transistor arrays; with switch means selectively and cyclically connecting the fast rise time pulse output, in the range of 2,000 to 10,000 cycles per second or more, of the fast rise time pulse output of the signal pulser circuit to one battery set of connections at a time.

27. The combination rejuvenator and trickle charger of claim 26, wherein batteries connected to said sets of battery connections are series connected; and are series connected between the positive terminal of a standard DC charging system and ground common to said standard battery DC charging system.

28. The combination rejuvenator and trickle charger of claim 27, wherein said combination rejuvenator and trickle charger includes, a battery selector switch for repeated cycles of rejuvenator pulse signal application to battery connection sets through the range of connection sets switch selected.

29. The combination rejuvenator and trickle charger of claim 28, wherein a cycle timing switch is settable to desired rejuvenating pulse output time cycles of operation.

* * * * *